Oct. 2, 1951     R. W. METTLER     2,570,144
FOLDING BOX FORMING MACHINE
Filed July 13, 1949     6 Sheets-Sheet 1

INVENTOR.
ROLLIN W. METTLER
BY
AUSTIN WILHELM+CARLSON
by Howard G. Russell
ATTORNEYS Oct. 2, 1951  R. W. METTLER  2,570,144
FOLDING BOX FORMING MACHINE
Filed July 13, 1949  6 Sheets-Sheet 2

INVENTOR.
ROLLIN W. METTLER
BY
AUSTIN WILHELM & CARLSON
by Howard G. Russell
his ATTORNEYS Oct. 2, 1951  R. W. METTLER  2,570,144
FOLDING BOX FORMING MACHINE
Filed July 13, 1949  6 Sheets-Sheet 5

INVENTOR.
ROLLIN W METTLER
BY
AUSTIN WILHELM & CARLSON
by Howard G. Russell
his ATTORNEYS INVENTOR.
ROLLIN W. METTLER
BY
AUSTIN WILHELM & CARLSON
by Howard G. Russell
his ATTORNEYS

Patented Oct. 2, 1951

2,570,144

UNITED STATES PATENT OFFICE 2,570,144

FOLDING BOX FORMING MACHINE

Rollin W. Mettler, Hamden, Conn., assignor to National Folding Box Company, Inc., New Haven, Conn., a corporation of Connecticut Application July 13, 1949, Serial No. 104,431

6 Claims. (Cl. 93—53)

This invention relates to improvements in automatic machines for setting up folding boxes from flat box blanks and has particular application to machines of the type into which a flat collapsed tubular pre-glued box blank is fed which is then set up or squared by the machine into hollow box form to emerge from the machine either ready for filling with one end of the box completed and glued, or filled with contents, in which event both ends of the box would be closed.

A great many forms of mechanisms are in use or have been proposed for squaring pre-glued flat collapsed tubular box blanks. In most of the known machines for squaring tubular box blanks the matter of timing is an important and critical one. These machines generally include some form of conveyor mechanism for moving the box blank from one end of the machines to the other and usually there are provided elements separate from, and independently movable of, the conveyor which engage the box blank in such a way that the motion of the movable member relatively to the motion of the conveyer results in squaring of the box blank. In many instances the movable member and the conveyor move at different linear speeds and finally reach a point at which they are spaced a predetermined distance which is equal to a certain dimension of the box, for example, the distance from one side edge of the box to its diagonally opposite side edge.

It is manifest that in machines of this type the timing of the various elements is critical and that even slight mis-timing or maladjustment results in a mis-shaped box. Such mis-timing or maladjustment may be the result of natural wear of parts, or more frequently it may be the result of accidental jamming of blanks in the machine. If after the clearing up of a jam it is discovered that the adjustment of the machine was disturbed a considerable number of blanks have passed through or into the machine, all of which are irregular in shape and must be discarded.

The present invention eliminates such waste and disturbance by providing mechanism for squaring the blanks which is entirely independent of the rate of travel, or the position of any particular elements on the conveyor with respect to fixed or independently operated and timed members. More particularly, the conveyor which moves the box blanks through the machine is so constructed that it accurately squares the blanks by means of self contained mechanism, independent of rate of advance of the conveyor and independent of the operation of the feeding mechanism which feeds blanks into the machine.

The improved mechanism squares blanks with great accuracy which is important for seal end boxes from a point of view of appearance and is even more important for hinge-cover boxes since the fit of the hinge cover depends to a large extent on the accuracy with which the body portion of the box is assembled. It is particularly important for reclosable hinge cover boxes of the type which comprise automatic means for maintaining the cover in closed position.

The various objects, features, and advantages of the invention will appear more fully from the detailed description which follows accompanied by drawings showing, for the purpose of illustration, the essential portion of a box machine embodying the invention. The invention also consists in certain new and original features of construction and combination of elements hereinafter set forth and claimed.

Although the characteristic features of the invention which are believed to be novel will be particularly pointed out in the claims appended hereto, the invention itself, its objects and advantages, and the manner in which it may be carried out may be better understood by referring to the following description taken in connection with the accompanying drawings forming part of it in which;

Figure 1:
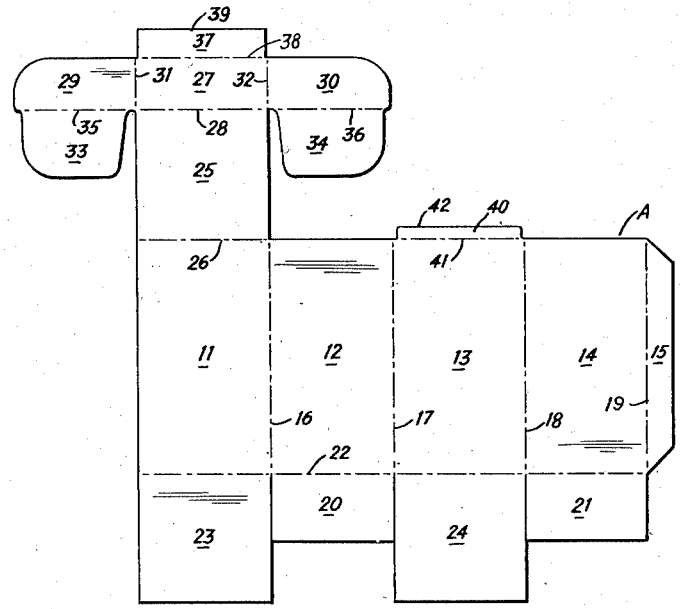
Figure 1 is a flat, cut and scored blank of a reclosable hinge cover box, the blank being shown in plan view as it appears after cutting from a larger sheet of paperboard.

In the following description and in the claims various details will be identified by specific names for convenience. The names, however, are intended to be as generic in their application as the art will permit. Corresponding reference characters refer to corresponding parts in the several figures of the drawings.

In the drawings accompanying, and forming part of, this specification, certain specific disclosure of the invention is made for the purpose of explanation of broader aspects of the invention, but it is understood that the details may be modified in various respects without departure from the broad principles of the invention and that the invention may be applied to other structures than the ones shown.

The blank A shown in Figure 1 comprises side wall panels 11, 12, 13 and 14 and a terminal glue lap 15 hingedly connected along side fold lines 16, 17, 18 and 19. Bottom flaps 20 and 21 are hingedly connected to the side wall panels 12 and 14, respectively, along a bottom fold line 22, and bottom panels 23 and 24 are hingedly connected to the side wall panels 11 and 12 along the same fold line 22.

The reclosable hinge cover structure comprises a main cover panel 25 hingedly connected to the side wall panel 11 along a cover fold line 26. A cover front panel 27 is hinged to the main cover panel along a top fold line 28, and cover side panels 29 and 30 are hinged to the cover front panel along front fold lines 31 and 32 respectively. Glue flaps 33 and 34 are hinged to the cover side panels along side fold lines 35 and 36, respectively, and serve to connect the cover side panels to the main panel. An abutment flap 37 is connected to the cover front panel 27 along a fold line 38 and has an abutment or locking edge 39 whose purpose will presently appear.

A lock flap 40 is hingedly connected to the side wall panel 13 along a fold line 41. This lock flap is foldable back upon the side wall panel 13 and its terminal edge 42 is adapted to engage the locking edge 39 of the abutment flap 37 in edge-to-edge relation in the finished carton for the purpose of maintaining the cover locked.

The blank A is shown in the form in which it is cut from a large sheet or roll of foldable stock. It is ready for a preliminary folding and gluing operation which converts the flat blank into a tubular structure ready for setting up into hollow box form on an automatic box forming machine.

Figures 2, 3:
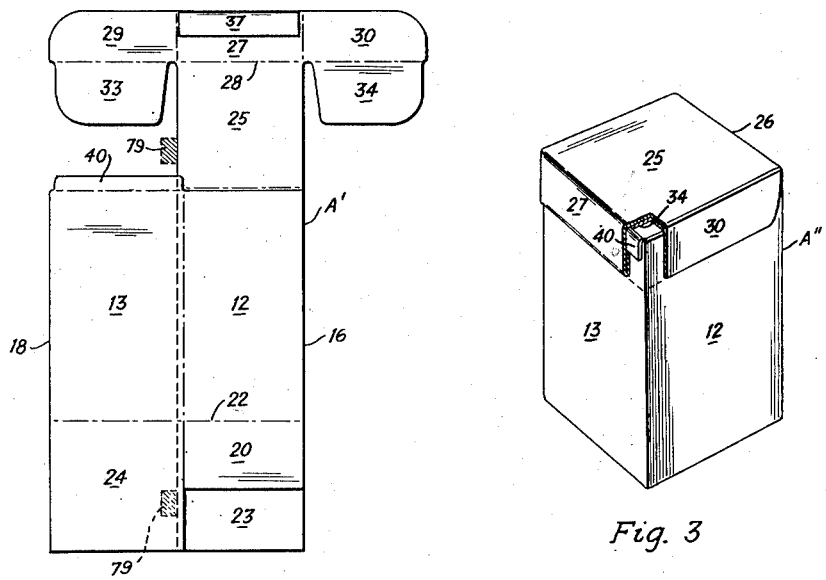
Figure 2 is a plan view of the blank of Figure 1 after initial folding and gluing operations resulting in a tubular flat collapsed blank ready for feeding into a box forming machine.
Figure 3 is a perspective view, partly in section, of the completed hinge cover box made from the blank of Figure 2.
Figure 4:
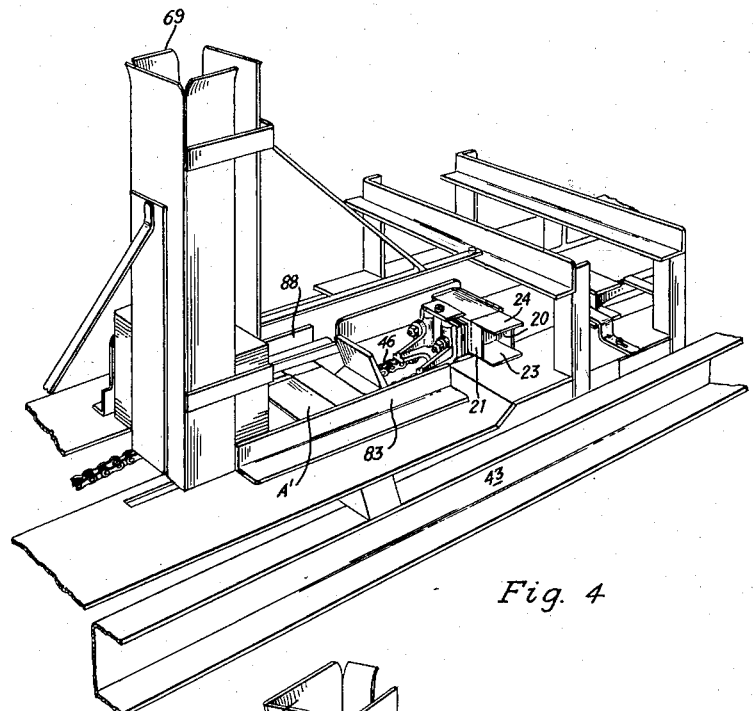
Figure 4 is a perspective view of that portion of a box forming machine which comprises the blank magazine and the beginning of the conveyor which carries the blank through the machine.

The blank A is converted into a tubular structure by applying adhesive to the glue lap 15 followed by folding of the blank at the fold lines 16 and 18. This brings the glue lap 15 into adhesive engagement with the side wall panel 11 and brings the side wall panels 12 and 13 into face-to-face contact with the side wall panels 11 and 14, respectively. Likewise, adhesive is applied to the abutment flap 37 and the flap is folded over and adhered to the cover front panel 27. The resulting tubular blank A' is shown in Figure 2. It is ready for setting up into hollow box form.

Collapsed flat tubular blanks A' may be stored and shipped in flat condition requiring a minimum of space. These are immediately available for setting up into hollow box form on automatic machinery.

An understanding of the construction and operation of the automatic box forming machine about to be described will be facilitated by a brief consideration of the construction of the finished box A'' shown in Figure 3. The box has a squared body portion comprising the wall panels 11, 12, 13 and 14 of which two are visible in Figure 3. The bottom of the box is formed by infolding of the bottom flaps 20 and 21 and by folding thereover the bottom panels 23 and 24, the flaps and panels being adhesively secured to one another.

The hinge cover comprises the main cover panel 25 to which the glue flaps 33 and 34 are adhesively secured, flap 34 being visible at the cut-away portion of the illustrated box. The cover front panel 27 with its abutment flap 37 overlies the lock flap 40 on the top portion of the wall panel 13, the lock flap 40 being downfolded to engage the abutment flap 37 with its free edge.

The hinge cover is opened by swinging it about its hinge line 26 against the resistance of the lock flap 40. The lock flap together with the upper portion of the wall panel 13 resiliently flexes during the disengagement and returns immediately into operative locking position for re-locking the hinge cover upon reclosing of the box.

Figure 18:
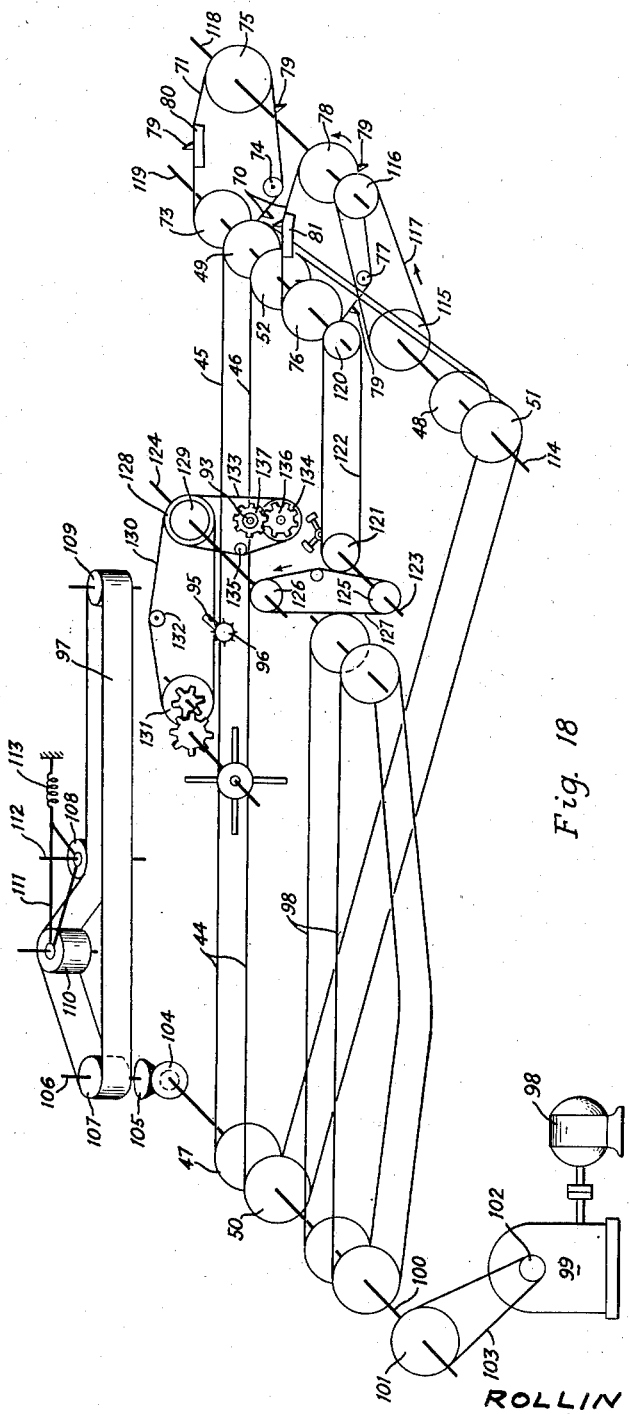
Figure 18 is a diagrammatic perspective view of the drive and conveyor mechanism of the machine.

Referring now to the several illustrations of the box forming machine in connection with a diagrammatic illustration of its major parts, Figure 18, the machine comprises a base 43 upon which an endless first conveyor 44 is mounted. This conveyor consists of a pair of endless chains 45 and 46 trained about gears 47, 48, 49 and 50, 51 and 52, respectively (Figure 18). The chains 45 and 46 of the first conveyor carry a plurality of box forming and blank squaring cages 53 which are shown in greater detail in Figure 6.

Each of the cages 53 comprises a bottom member 54 with which an upright end member 55 is integral. The bottom member 54 and the end member 55 form an angle of 90 degrees between them at 56 and are secured to special links 57 of the conveyor chain 45 having upward extensions 58. In a similar manner, the bottom member 54 is connected to the other chain 46 and thus travels with the conveyor relatively to the base 43.

A tiltable end member 59 is hingedly connected to the bottom member 54 at 60 and is free to tilt relatively to the bottom member 54 if the chain permits it to do so. The end member 59 has a normally upright portion 61 and a normally horizontal portion 62 extending at right angles to the portion 61. The horizontal portion 62 carries wear resistant abutments 63 adapted to engage links of the conveyor chains 44 and 45. Only the abutments 63 cooperating with the chain 45 are visible in Figure 6. The movable end member 59 carries a pressure plate 64 mounted on a pair of studs 65 slidable in the upright portion 61 and biased towards the end member 55 by compression springs 66. Nuts 67 permit adjustment of the spacing between the pressure plate 64 and the end member 55. The spacing is made equal to the outside width of the box to be set up, that is the distance between the side walls 12 and 14 measured at the outside of the box.

A projection 68 extends from the upright portion 61 towards the end member 55. It is spaced from the bottom member 54 a distance equal to the depth of the box, that is the distance between the walls 11 and 13 measured at the outside of the box. The projection serves to grasp a flat blank and urge it towards the corner 56 thereby expanding the blank under the force exerted upon it.

As the box forming cage 53 passes over a curved portion of the conveyor path, for example, over the wheels 49 and 52, the tiltable end member 59 tilts back and opens the cage. In the position illustrated in Figure 6 one of the two box forming cages is open for insertion of a flat collapsed blank fed into it from a magazine 59 by a feed conveyor 70.

The feed conveyor is composed of two endless chains 71 and 72 trained over rollers 73, 74, 75 and 76, 77, 78, respectively, and carries feed lugs 79. Specially shaped guide rails 80 and 81 determine the path of the upper flight of the conveyor chains to bring the lugs 79 into proper position to engage the lowermost blank in the magazine 69 and withdraw it towards the conveyor 44 carrying the box forming cages 53. The points at which the lugs 79 engage the blank A' are indicated in Figure 2.

The blank A' travels between vertical guide rails 82 and 83 and moves into an open box forming cage. The feed conveyor 70 disengages from the blank as its lugs withdraw downwardly when the feed conveyor passes over the rollers 73 and 76 (Figure 18).

Figure 5:
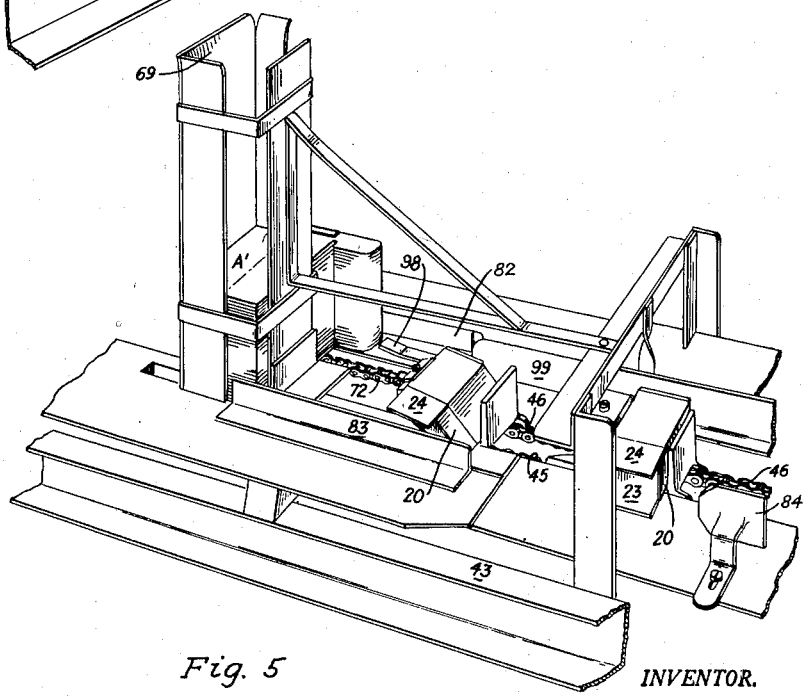
Figure 5 is a perspective view of the machine portion shown in Figure 4 viewed at a different angle and shown at a slightly advanced phase of operation.

The blank is then grasped by the projection 68 of the tiltable end member 59, as the end member slowly moves into upright position. The flat box blank is thus held at one edge by the pressure plate 64 and the projection 68 and is held at its opposite edge by the bottom and end members 54, 55 at the corner 56. The force exerted on the blank A' causes it to open up into square shape. Figure 5 shows one blank in the process of squaring and a second blank fully erected. The cage 53 during its travel along the straight portion of the conveyor 44 maintains the blank accurately squared for performance of the bottom closing and sealing operations which will now be described.

As the squared blank moves on, its end panels 23 and 24 are first engaged by a stationary spreader 84 which spreads the end panels apart and out of the way of the end flaps 20 and 21. While the end panels 23 and 24 are still engaged by the spreader the leading end flap 20 strikes a stationary sweep 85 (Figure 7) which folds the end flap 20 into a position at right angles with respect to the box side walls. Substantially simultaneously the trailing bottom flap 21 is engaged by an arm 86 of a kicker 87 pivotally mounted at 88 on the base 43. The kicker 87 comprises a cam 89 which is struck by a cam 90 on the cage 53. The kicker moves in a clockwise sense when actuated by a passing cage and folds the bottom flap 21 into a position substantially at right angles with respect to the box side walls. The infolded trailing bottom flap 21 then comes within the reach of the stationary sweep 85 and is maintained in infolded position while the kicker returns to its rest position in a counterclockwise sense under action of a biasing spring (not shown). In its rest position the kicker arm 86 is out of the way of the bottom panel 23 of the succeeding box blank which thus passes over it freely.

Figure 7:
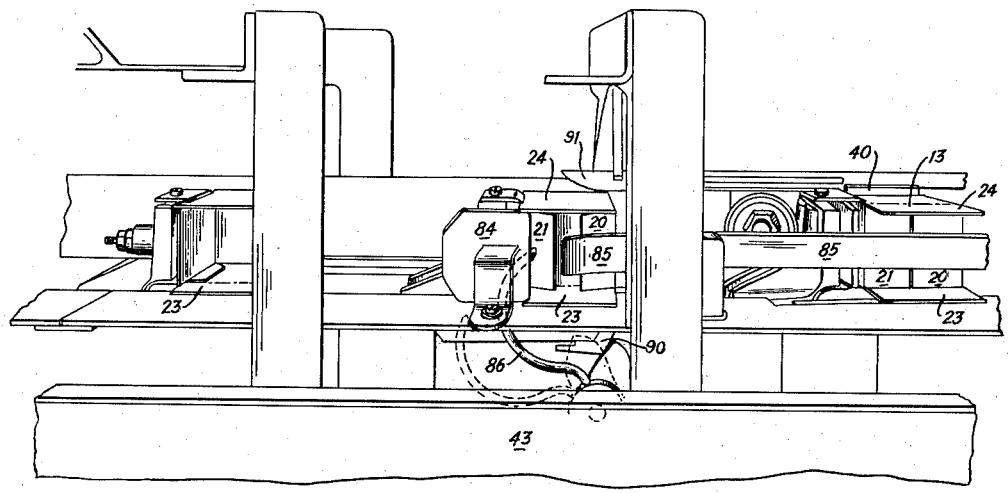
Figure 7 is a perspective view of a further portion of the box machine for sealing the bottom end of the box.
Figure 8:
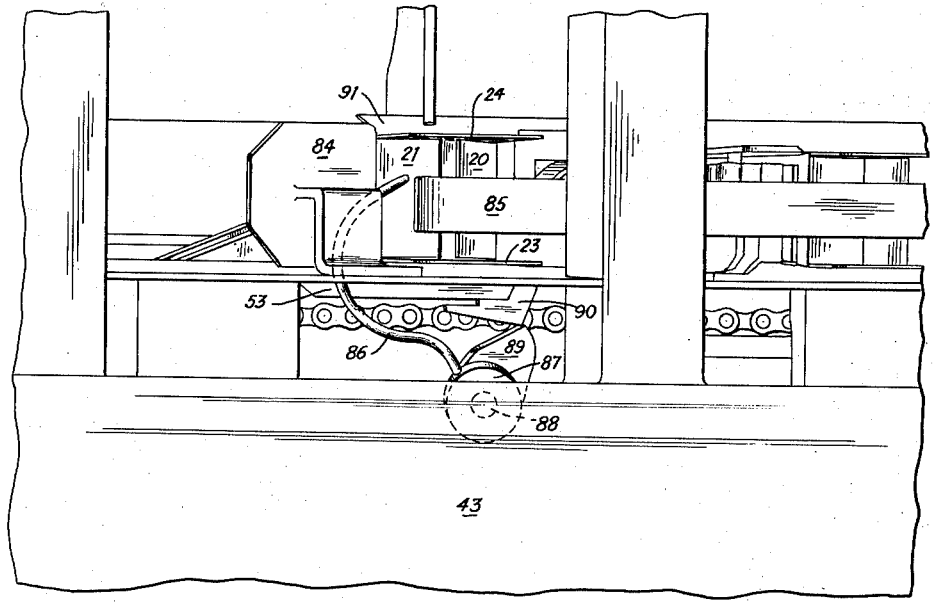
Figure 8 is a detailed view of a portion of the mechanism shown in Figure 7 at a slightly advanced stage of operation.
Figure 9:
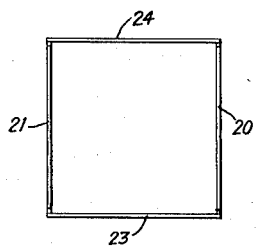
Figures 9 to 16 are diagrammatic illustrations of successive steps in sealing the bottom end of the box.
Figure 10:
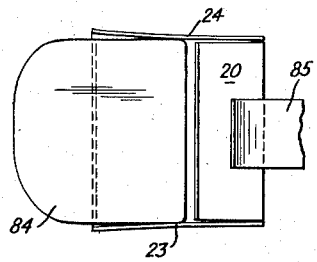
Figure 11:
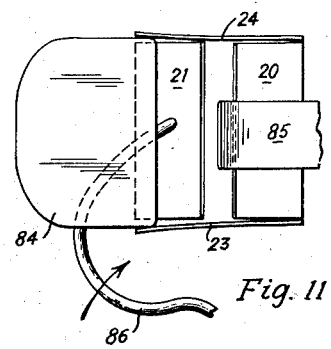
Figure 12:
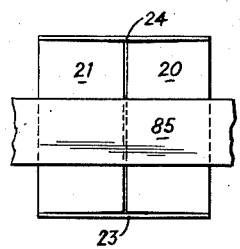

During the folding of the inner end flaps into box closing position the lock flap 40 of the box moves within the reach of the folding rail 91 which folds the lock flap about its hinge line 41 through an angle of 180 degrees into a position to overlie the box wall panel 13 (Figure 7).

Figure 13:
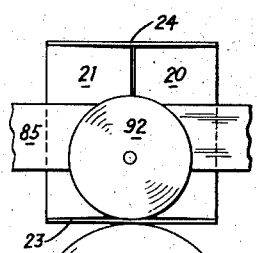
Figure 14:
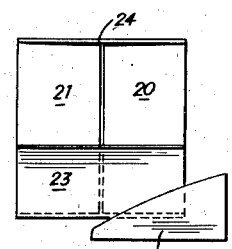
Figure 15:
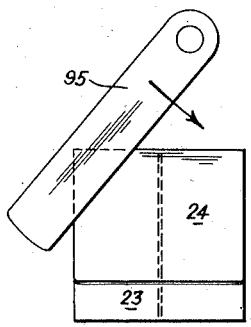
Figure 16:
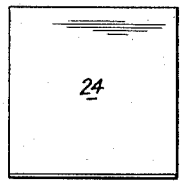
Figure 17:
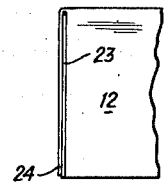
Figure 17 is a side view of the sealed box end shown in Figure 16.

While the inner end flaps 20 and 21 are still engaged by the sweep 85, the inner bottom panel 23 moves past a pair of glue wheels 92 and 93 (Figure 13) which apply adhesive to both sides of the bottom panel 23. The bottom panel 23 then moves within the reach of a stationary plow 94 (Figure 14) which folds the bottom panel into upright position against the infolded bottom flaps 20 and 21. Immediately thereafter a rotary sweep or arm 95 driven by a sprocket wheel 96 engages the outer end panel 24 and folds it into bottom closing position as shown in Figures 15 and 16.

The folded bottom structure is then engaged by a pressure belt 97 which travels at the same rate as the conveyor 44 and maintains a gentle pressure on the outer bottom panel 24 for a time sufficient to permit the adhesive to set.

Figure 6:
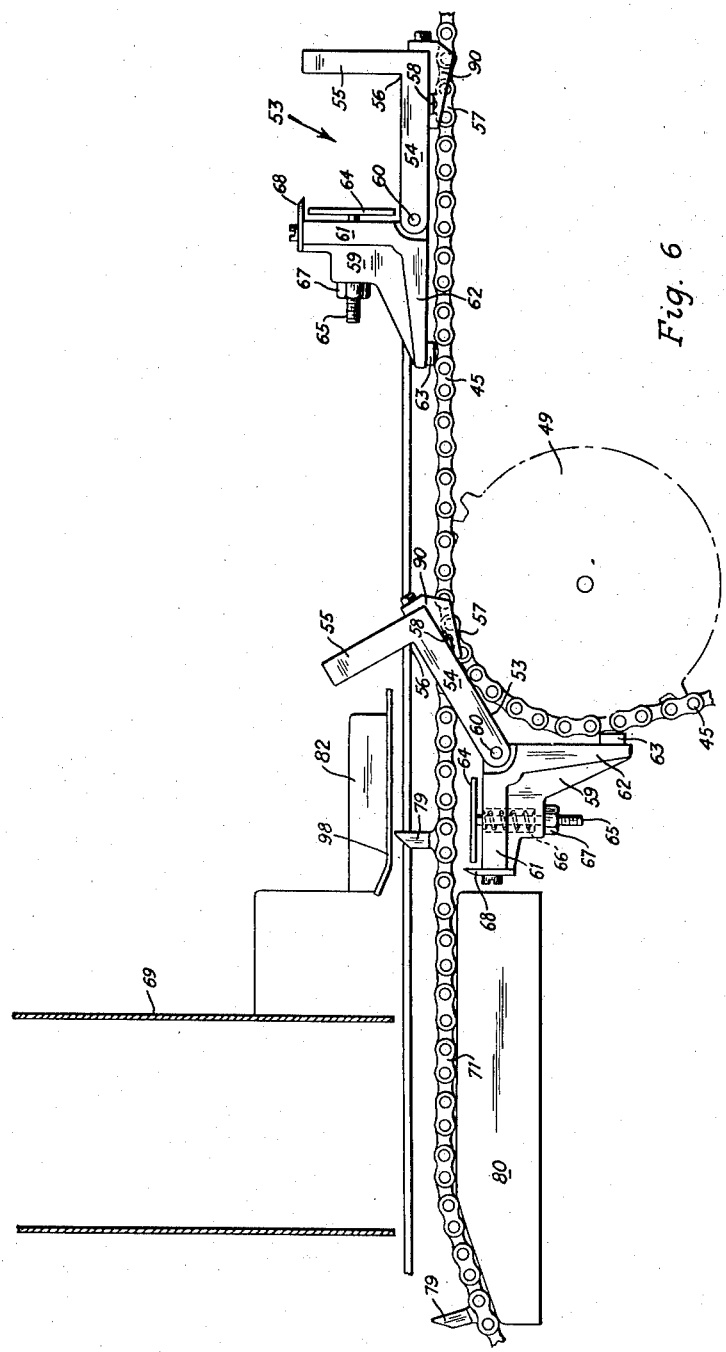
Figure 6 is an elevational view of certain elements of the machine portion shown in Figures 4 and 5.

The sealed bottom maintains the box squared when it is discharged at the end of the conveyor 44. As the conveyor chains 45 and 46 travel over the chain gears 47 and 50, the cages 53 open in a similar manner as illustrated in Figure 6 and the glued boxes drop out.

Means may be provided for forming and gluing the top portion of the box. Such folding and gluing mechanism may include a further conveyor 98 for the cover assembly extending parallel to the conveyor 44 and traveling at the same rate. Since, however, the present invention disclosed in this application is not concerned with details of the mechanism for forming and gluing the box cover, a description of the details may be dispensed with.

The drive mechanism of the machine is diagrammatically illustrated in Figure 18.

A suitable prime mover, shown as a motor 98, drives a reduction gear 99. The main drive shaft 100 of the machine carries a chain gear 101 driven from the pulley 102 of the reduction gear through a drive chain 103.

The drive shaft 100 carries the chain gears 47 and 50 of the conveyor 44 and also a bevel gear 104 meshing with a further bevel gear 105 on a shaft 106. The shaft 106 carries a belt pulley 107 around which the pressure belt 97 is trained. There are further belt pullies 108 and 109 stationary with respect to the machine base and a movable belt pulley 110 mounted on a frame 111 pivoted at 112. The frame 111 is under the action of a spring 113 tending to keep the belt 97 under tension.

The chain gears 48 and 51 around which the conveyor chains 45 and 46 are trained are fixed on a shaft 114. Shaft 114 carries a further chain gear 115 driving a gear 116 through a drive chain 117. The gear 116 is fixed on a feeder drive shaft 118 carrying the gears 75 and 78 of the feed conveyor.

The chain gears 49 and 52 of the conveyor chains 45 and 46 are fixed on a shaft 119. The gears 73 and 76 of the feed conveyor are loosely mounted on the shafts 119 to rotate freely thereon. A pulley 120 is fixedly mounted on the shaft 119 and drives a chain gear 121 through a chain 122. The gear 121 is fixed on a shaft 123 driving a further shaft 124 through gears 125 and 126 and a drive chain 127. The shaft 124 carries a pair of chain gears 128 and 129. The gear 128 drives a chain 130 trained over a further gear 131 and a tension pulley 132. The chain 130 engages the sprocket wheel 96 of the rotary sweep 95 and drives it. The rotary swep thus moves at a predetermined rate with respect to the rate of advance to the conveyor 44.

The gear 129 drives a chain 133 trained around a further gear 134 and a tension pulley 135. A spur gear 136 turns with the chain gear 134 and meshes with a second spur gear 137 driving the glue wheel 93.

The invention thus provides a relatively simple machine for squaring collapsed flat box blanks. The squaring operation as well as the folding and gluing operations are all controlled by the advance of the conveyor which moves the blanks through the machine.

Thus a relatively simple machine results which can be operated at reduced or increased speeds without affecting the accuracy of the boxes formed thereon.

What is claimed is:

1. A device for forming a hollow box structure from a tubular flat collapsed box blank, the device comprising a body having a base portion and a rigid end portion upright with respect to the base portion and forming substantially a right angle therewith; a member hingedly mounted on the body and movable into a position upright with respect to the base portion from a declined position with respect thereto, said hinged member having a projection extending towards said end portion when the member is in upright position, the projection being adapted to grasp an edge of a flat box blank to urge said blank into said angle with its opposite edge, thereby expanding it into hollow form; a spring-urged pressure plate mounted on said movable member in a position parallel with the end portion when the member is in upright position, to constrain between the plate and said end portion opposite walls of said hollow box form; and an endless conveyor chain mounted to run along a straight path between curved path portions, said body being secured to said chain with said end portion leading and said hinged member trailing, the hinged member bearing against a portion of the chain spaced and trailing with respect to the point at which the body is secured thereby causing the hinged member to tilt relatively to said body at said curved path portions.

2. A device for forming a hollow box structure from a tubular flat collapsed box blank, the device comprising a body having a base portion and a rigid end portion upright with respect to the base portion and forming substantially a right angle therewith; a member hingely mounted on said body and movable into a position upright with respect to the base portion from a declined position with respect thereto, said hinged member having a projection extending towards said end portion when the member is in upright position, the projection being adapted to grasp an edge of a flat box blank to urge said blank into said angle with its opposite edge, thereby expanding it into hollow form; and an endless conveyor chain mounted to run along a straight path between curved path portions, said body being secured to said chain with said end portion leading and the hinged member trailing, the hinged member bearing against a portion of the chain spaced and trailing with respect to the point at which the body is secured, thereby causing the hinged member to tilt relatively to said body at said curved path portions.

3. A device for forming a hollow box structure from a tubular flat collapsed box blank, the device comprising a body having a base portion and a rigid end portion upright with respect to the base portion and forming substantially a right angle therewith; a member hingedly mounted on said body and movable into a position upright with respect to the base portion from a declined position with respect thereto, said hinged member having a projection extending towards said end portion when the member is in upright position, the projection being adapted to grasp an edge of a flat box blank to urge said blank into said angle with its opposite edge, thereby expanding it into hollow form; an endless conveyor chain mounted to run along a straight path between curved path portions, said body being secured to said chain with said end portion leading and said hinged member trailing, the hinged member bearing against a portion of the chain spaced and trailing with respect to the point at which said body is secured, thereby causing the hinged member to tilt relatively to said body at said curved path portions; and blank feeding means for feeding collapsed flat blanks between said body end portion and said hinged member at a curved path portion.

4. A device for forming a hollow box structure from a tubular flat collapsed box blank including box walls and end panels, the device comprising, a cage adapted to engage the hollow box along three box walls, said cage including a bottom member, an end member upright with respect to the bottom member and integral with the bottom member, and a movable member hinged on said bottom member and movable into a position upright with respect to the bottom member from a declined position with respect to the bottom member, said hinged member having a projection extending towards said end member when said movable member is in upright position, the projection being adapted to grasp an edge of a flat box blank to urge said blank into the angle between said bottom member and said end member with its opposite edge, thereby expanding the blank into hollow form; means for moving said cage along a track; means associated with the track for inclining said movable member and for declining said movable member at spaced points of the track; and means along said track intermediate said points for folding the box end panels into closing position to maintain said box in rigid expanded condition prior to the opening of the cage by movement of the movable member into declined position, said end panel folding means including a kicker for moving the trailing end panel into box closing position; and a cam member on said cage for actuating said kicker upon passage of the cage past the kicker.

5. A device for forming a hollow box structure from a tubular flat collapsed box blank including box walls and end panels, the device comprising, a cage adapted to engage the hollow box along three box walls, said cage including, a bottom member, an end member upright with respect to the bottom member and integral with the bottom member, and a movable member hinged on said bottom member and movable into a position upright with respect to the bottom member from a declined position with respect to the bottom member, said hinged member having a projection extending towards said end member when said movable member is in upright position, the projection being adapted to grasp an edge of a flat box blank to urge said blank into the angle between said bottom member and said end member with its opposite edge, thereby expanding the blank into hollow form; a base; an endless conveyor chain mounted on the base for movement along a straight path between curved path portions, said cage being secured to said chain for movement therewith with said end member leading and said hinged member trailing, said hinged member engaging said chain at a point spaced and trailing with respect to the point at which the cage is secured thereby causing the hinged member to tilt relatively to the bottom member at said curved path portions; means on said base for folding the box end panels into box closing position, said folding means including a kicker for engaging the trailing end panel and moving it into box closing position; and a cam member on said cage for actuating said kicker upon passage of the cage past the kicker.

6. A device for forming a hollow box structure from a tubular flat collapsed box blank including box walls and end panels, the device comprising, a cage adapted to engage the hollow box along three box walls, said cage including, bottom member, an end member upright with respect to the bottom member and integral with the bottom member, and a movable member hinged on said bottom member and movable into a position upright with respect to the bottom member from a declined position with respect to the bottom member, said hinged member having a projection extending towards said end member when said movable member is in upright position, the projection being adapted to grasp an edge of a flat box blank to urge said blank into the angle between said bottom member and said end member with its opposite edge, thereby expanding the blank into hollow form; a base; an endless conveyor chain mounted on the base for movement along a straight path between curved path portions, said cage being secured to said chain for movement therewith with said end member leading and said hinged member trailing, said hinged member engaging said chain at a point spaced from, and trailing with respect to, the point at which the cage is secured thereby causing the hinged member to tilt relatively to the bottom member at said curved path portions; blank feeding means for feeding collapsed flat blanks between said end member and said movable member at a curved path portion; means on said base for folding the box end panels into box closing position, said folding means including a kicker for engaging the trailing end panel and moving it into box closing position; a cam member on said cage for actuating said kicker upon passage of the cage past the kicker, and a spring loaded pressure plate mounted on said movable member in a position parallel with the end member when the movable member is in upright position to constrain opposite walls of the box under spring pressure between said plate and said end member.

ROLLIN W. METTLER.

REFERENCES CITED

The following references are of record in the file of this patent:

UNITED STATES PATENTS

| Number | Name | Date |
| --- | --- | --- |
| 1,275,759 | Russell | Aug. 13, 1918 |
| 1,873,059 | Smith | Aug. 23, 1932 |
| 2,291,010 | Vergobbi | July 28, 1942 |